Patented Mar. 8, 1932

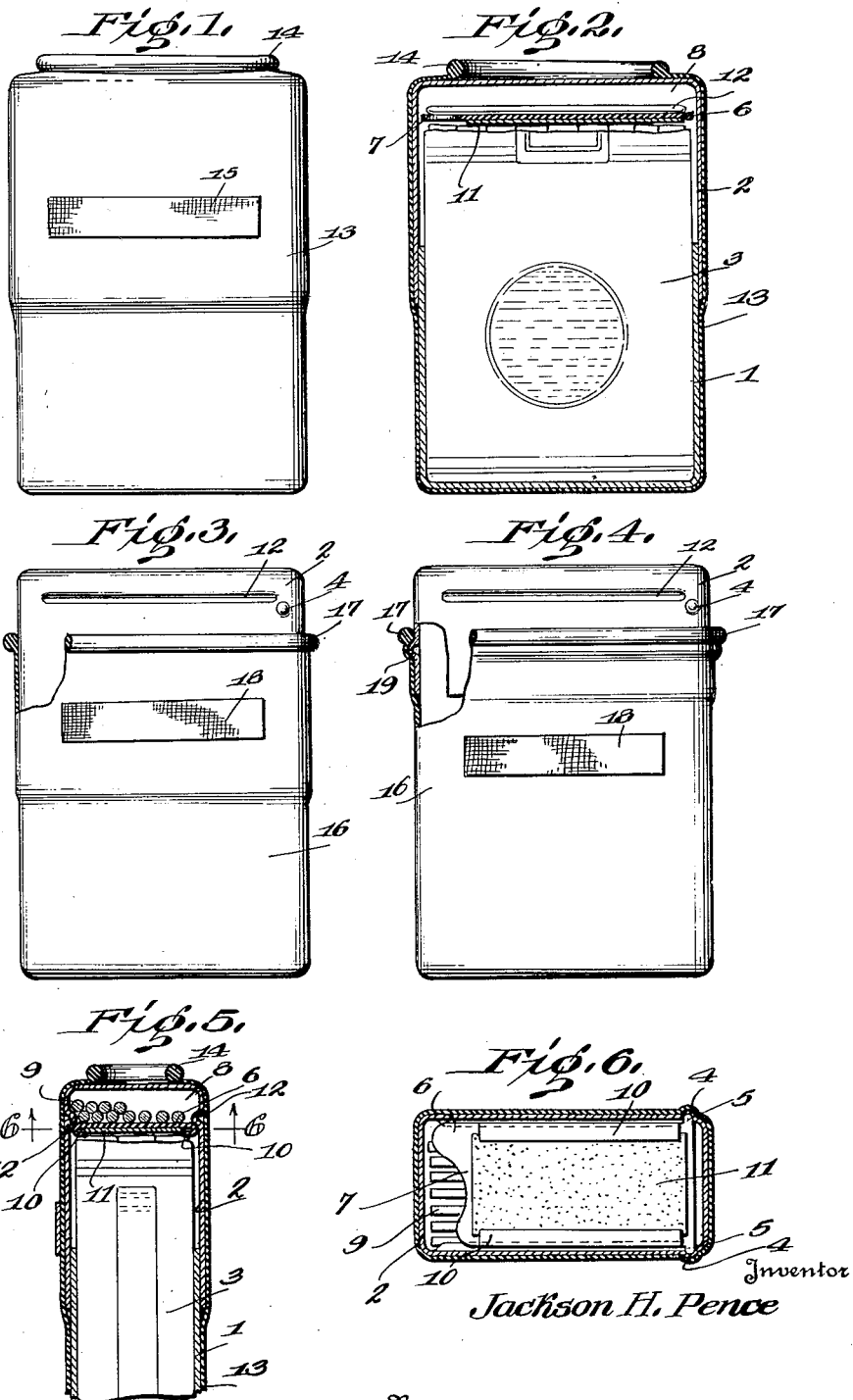

1,848,652

UNITED STATES PATENT OFFICE

JACKSON H. PENCE, OF ALTOONA, PENNSYLVANIA

RECEPTACLE OR CONTAINER

Application filed March 24, 1928. Serial No. 264,368.

My invention relates to new and useful improvements in a receptacle or container and more particularly to such a device adapted for holding cigarettes, matches, vanity cases, or the like, and the principal object of the invention resides in the provision of means whereby the receptacle or container is made waterproof so that it may be worn or carried by a bather without damage to the contents by water.

Another object of the invention resides in the provision of a receptacle or container formed of sections with their open ends adapted to telescope, an elastic waterproof casing being provided to receive the receptacle or container and to enclose or cover the joint formed by the telescoping ends of the sections, and said elastic waterproof casing aiding in holding the sections of the receptacle or container in telescoped or overlapped condition against accidental displacement.

A further object consists in so forming the elastic waterproof casing that when it is desired to gain access to the interior of the receptacle or container that a portion thereof may be rolled down over said receptacle or container until the overlapped or telescoping ends of the sections will be exposed and one section may be moved relative to the other so that access may be had to the contents of the said receptacle or container.

A still further object consists in providing means within one of the sections of the receptacle or container to house matches or the like, said means including a flexible plate or strip which may be positioned to house the matches or the like adjacent the closed end of the section and provided with means forming a scratching surface for the matches.

With the above and other objects in view, which will appear as the description proceeds, my invention consists in the novel details of construction and arrangement of parts described in the following specification and illustrated in the accompanying drawings and while I have illustrated and described the preferred embodiments of the invention, as they now appear to me, it will be understood that such changes may be made as will fall within the scope of the appended claims.

In the drawings:

Fig. 1 is a side elevation.

Fig. 2 is a longitudinal vertical section with parts shown in side elevation.

Fig. 3 is a side elevation showing a slightly modified form of elastic waterproof enclosing casing with a portion thereof broken away.

Fig. 4 is a view similar to Fig. 3 showing the further modified form of enclosing casing and a slightly modified form of receptacle or container.

Fig. 5 is a fragmental transverse vertical section with parts shown in end elevation; and Fig. 6 is a horizontal section on the line 6—6 of Fig. 5 looking in the direction of the arrows.

In carrying out my invention the container or receptacle is preferably formed of metal, celluloid, rubber or similar material and consists of the sections 1 and 2 each of which has an open end, the open ends being adapted to be telescoped or overlapped as shown more particularly in Fig. 2 of the drawings. The section 1 will hereinafter be referred to as the bottom of the container or receptacle whereas the section 2 will be referred to as the top or cover. The receptacle or container is of such a size as to receive a package of cigarettes or the like, as indicated at 3, and formed interiorly of the top or cover section 2, adjacent the upper end thereof, are the indentations 4 adapted to receive projections 5 formed at one end of a flexible strip or plate 6 preferably of rubber. The strip or plate 6 is of such a width as to fit snugly between the sides of the top or cover section 2 and is cut away at one end as shown at 7 to provide a space for the finger of the user whereby the plate or strip may be swung to gain access to the compartment 8 formed between the top end of the cover section 2 and the inner face of the strip or plate, such compartment 8 being of a size to receive a plurality of matches indicated at 9. Formed along the longitudinal edges of the plate or strip 6 and extending inwardly parallel with the bottom face of the strip or plate are the flanges 10 forming a guide for a strip of emery 11 or the like which forms a scratch surface for igniting the matches. Struck inwardly from the top or cover section 2, adjacent the closed end thereof, are the longitudinally extending ribs 12 which form an abutment for the strip or plate 6 and limit the swinging movement thereof in a direction towards the closed end of the top or cover section. It will be understood that when the cover section 2 is removed from the bottom 1 of the container that the user may insert his finger through the open end of the top or cover and by engaging the finger in the cut-out portion 7 of the strip or plate 6 the end thereof may be engaged and the strip or plate swung towards the open end of the top or cover, to gain access to the matches within the compartment 8, it being understood that the projections 5 entering the indentations or recesses 4 form a connection for one end of the strips or plates and the strip or plate being of flexible material will readily yield while the strip or plate 6 is preferably of such rigidity or strength as to normally return to its original position. It will be seen by reference to Fig. 2 of the drawings that when the cover or top is in position upon the base or bottom that the upper ends of the cigarettes will engage the plate or strip and hold the same in closed position against the ribs 12.

At 13 I have indicated an elastic waterproof casing adapted to enclose the receptacle or container to enclose the overlapped or telescoped ends of the sections of the container or receptacle and to form a waterproof seal. The casing is formed with an open end around the edge of which is formed a relatively heavy bead 14 which may be engaged for rolling the casing down and from the receptacle or container to such a point that the telescoped joint will be exposed and the top or cover 2 may be removed from the base or bottom 1 so that access may be had to the cigarettes or matches. In the form of casing shown more particularly in Figs. 1, 2 and 5 of the drawings the upper end of the casing extends over the end of the top or cover 2 and aids in holding the top or cover 2 securely in position upon the base or bottom 1. In addition the elastic waterproof casing in passing over the edges of the top makes doubly sure the waterproof feature of the invention because of the contact thereof over the oval or round surface, this being of particular advantage should there be any irregularities in the formation or shape of the receptacle or container. At the same time the bead 14 forms a relatively large opening at the top so that the fingers of the user may engage the bead to roll the casing down around the receptacle or container. A strip of fabric 15 or similar material is vulcanized or secured to the casing 13 in other suitable manner and forms a portion which may be engaged by a pin or the like for securing the complete container or receptacle with the enclosing casing, to the garment of the user.

In Fig. 3 of the drawings I have shown at 16 a slightly modified form of elastic waterproof enclosing casing which is of less length than the casing shown in Figs. 1, 2 and 5 of the drawings. In the form of the invention shown in Fig. 3 a bead 17 is formed around the open end of the casing so that the same may be engaged to roll the casing down over the receptacle or container to expose the telescoped joint and to allow the cover 2 to be removed from the bottom 1 to gain access to the contents of the receptacle. As shown the casing does not come to the top or upper end of the cover but terminates a short distance therebeneath. However, the casing being of elastic material securely grips the cover and holds the same in position relative to the bottom. In this form of casing a fabric strip 18 is secured thereto by vulcanizing or in other suitable manner for the same purpose as described for the strip 15 in the preferred embodiment of the invention.

In Fig. 4 of the drawings I have shown a slightly modified form of cover 2 for the container or receptacle adapted to be used with the form of casing shown in Fig. 3. In this form of the invention an outwardly extending bead 19 is formed around the top or cover 2 and the upper end of the casing 16 is adapted to fit around this bead as quite clearly shown and to hold the cover in position relative to the bottom or base of the receptacle or container.

From the above it will be seen that I have provided a novel form of container or receptacle which is adapted to receive and hold cigarettes and matches and which has an elastic waterproof casing which overlaps and seals the joint between the bottom and cover of the container or receptacle and prevents the entrance of water or moisture into the container or receptacle. At the same time I provide novel means within the top or cover of the container or receptacle to form a compartment for containing the matches. The container or receptacle is of particular advantage to bathers who desire to carry with them their cigarettes or the like and while the container or receptacle might be carried in any desired position or secured in any suitable manner I have provided a fabric strip on the enclosing casing to be engaged by a pin or the like.

In view of official requirement for division, I will not claim herein the novel features of my device residing in the closure for the cap portion of the container adapted to provide the match compartment.

Having fully described my invention what

I claim as new and desire to secure by Letters Patent is:

1. A waterproof container for cigarettes comprising a body portion provided with a cap portion interfitting therewith, and a rubber-like envelope surrounding said body and cap, the envelope being open at its end and there provided with a bead contracting the envelope against the cap portion at a point beyond the line of juncture between the same and the body portion to seal the same while presenting the beaded end for engagement to roll the latter downwardly on to the body below said line of juncture to permit removal of the cap.

2. A waterproof container for cigarettes comprising a body portion provided with a cap portion interfitting therewith, and a rubber-like envelope surrounding said body and cap, the envelope being open at its end and there provided with a bead contracting the envelope against the cap portion at a point beyond the line of juncture between the same and the body portion to seal the same while presenting the beaded end for engagement to roll the latter downwardly on to the body below said line of juncture to permit removal of the cap, the envelope being of a length whereby the contracted beaded end extends over and lies against the end of the cap portion.

3. A waterproof container for cigarettes comprising a body portion provided with a cap portion interfitting therewith, and a rubber-like envelope surrounding said body and cap, the envelope being open at its end and there provided with a bead contracting the envelope against the cap portion at a point beyond the line of juncture between the same and the body portion to seal the same while presenting the beaded end for engagement to roll the latter downwardly on to the body below said line of juncture to permit removal of the cap, the envelope being of a length whereby the contracted beaded end extends over and lies against the end of the cap portion, the beaded end also remaining open to facilitate engagement of the fingers therewith in rolling the same to cap-releasing position.

4. A waterproof container for cigarettes comprising a body portion provided with a cap portion interfitting therewith, and a rubber-like envelope surrounding said body and cap, the envelope being open at its end and there provided with a bead contracting the envelope against the cap portion at a point beyond the line of juncture between the same and the body portion to seal the same while presenting the beaded end for engagement to roll the latter downwardly on to the body below said line of juncture to permit removal of the cap, the cap portion being formed with a beaded portion interfitting with the beaded portion of the envelope in a region between the end of the cap portion and the line of juncture between the same and the body portion.

5. A waterproof container for cigarettes comprising a body portion and a cap portion interfitting therewith, and a rubber-like envelope surrounding said body and cap portion, the envelope being open at its end and there provided with a bead contracting over and lying against the end of the cap portion to bind the envelope around and upon the cap portion thereby assisting in holding the same in closed position.

6. A waterproof container for cigarettes comprising a body portion provided with a suitable closure, and a rubber-like envelope surrounding said body and closure, the envelope being open at its end and there provided with a bead contracting over and lying against the corresponding end of the closed body portion to constitute a seal while presenting the beaded end of the envelope for engagement to roll the latter on to the body portion to permit opening of the closure.

In testimony whereof I hereunto affix my signature.

JACKSON H. PENCE.